United States Patent
Galozio et al.

(10) Patent No.: US 7,950,232 B2
(45) Date of Patent: May 31, 2011

(54) FUEL FEED CIRCUIT FOR AN AIRCRAFT ENGINE

(75) Inventors: Philippe Galozio, Lieusaint (FR); Cédric Montarou, St Maur des Fosses (FR); Denis Morin, Saint Maur des Fosses (FR)

(73) Assignee: Hispano Suiza, Colombes Cedex (FR)

( * ) Notice: Subject to any disclaimer, the term of this patent is extended or adjusted under 35 U.S.C. 154(b) by 221 days.

(21) Appl. No.: 12/246,562

(22) Filed: Oct. 7, 2008

(65) Prior Publication Data

US 2009/0094974 A1  Apr. 16, 2009

(30) Foreign Application Priority Data

Oct. 12, 2007 (FR) ...................................... 07 58246

(51) Int. Cl.
*F02C 1/00* (2006.01)
(52) U.S. Cl. ........................................................ 60/734
(58) Field of Classification Search .................... 60/734, 60/39.281, 396, 463, 468; 244/53 R
See application file for complete search history.

(56) References Cited

U.S. PATENT DOCUMENTS

| | | | | |
|---|---|---|---|---|
| 2,552,231 A * | 5/1951 | Streid et al. ...................... 431/62 |
| 2,720,752 A * | 10/1955 | Chandler et al. ............ 60/39.281 |
| 3,053,047 A * | 9/1962 | Bodemuller ............... 60/39.281 |
| 3,332,234 A * | 7/1967 | Lavash ...................... 60/39.281 |
| 4,016,716 A * | 4/1977 | Evans et al. ................ 60/39.091 |
| 4,899,535 A * | 2/1990 | Dehan et al. .................. 60/39.08 |
| 5,220,793 A * | 6/1993 | McGlone et al. ............... 60/734 |
| 6,487,847 B1 | 12/2002 | Snow et al. |
| 6,568,189 B2 * | 5/2003 | Blot-Carretero et al. ....... 60/772 |
| 6,655,123 B2 * | 12/2003 | Blot-Carretero et al. .. 60/39.281 |
| 6,655,151 B2 * | 12/2003 | Mahoney et al. ............... 60/773 |
| 6,810,674 B2 * | 11/2004 | Clements ........................ 60/773 |
| 2002/0184885 A1 | 12/2002 | Blot-Carretero et al. |
| 2004/0011052 A1 | 1/2004 | Clements |
| 2008/0163931 A1 * | 7/2008 | Brocard et al. ................. 137/10 |
| 2010/0064657 A1 * | 3/2010 | Mahoney et al. .......... 60/39.281 |

FOREIGN PATENT DOCUMENTS

EP  1 018 598 A2  7/2000

* cited by examiner

*Primary Examiner* — Michael Cuff
*Assistant Examiner* — Phutthiwat Wongwian
(74) *Attorney, Agent, or Firm* — Oblon, Spivak, McClelland, Maier & Neustadt, L.L.P.

(57) ABSTRACT

A head loss element is interposed between the outlet from the pump delivering high pressure fuel and the pipe feeding combustion chamber injectors. A servo-valve for feeding a hydraulic actuator of a variable-geometry component of the engine has an HP admission inlet connected to the outlet from the pump upstream from the head loss element and an LP outlet connected to the feed pipe downstream from the head loss element. Thus, the flow rate taken upstream from the head loss element for driving the actuator is compensated by the flow rate reinjected downstream from the head loss element, thereby avoiding any movement of the variable-geometry component giving rise to a disturbance in the flow rate delivered to the injectors.

8 Claims, 1 Drawing Sheet

FUEL FEED CIRCUIT FOR AN AIRCRAFT ENGINE

BACKGROUND OF THE INVENTION

The invention relates to a circuit for feeding fuel to an aircraft engine, and more particularly to a circuit delivering fuel for feeding combustion chamber injectors of the engine, and also for use as a hydraulic fluid for controlling actuators for actuating variable-geometry components of the engine.

As a general rule, the fuel feed circuit comprises a high pressure pump in the form of a positive displacement gear pump given by the engine via a gearbox known as an accessory gearbox (AGB). The flow rate delivered by the pump is not adapted to the real requirements of the engine and exceeds those requirements over a wide range of speeds of rotation of the engine. It is therefore necessary to add equipment to the outlet from the high pressure pump for metering the fuel delivered to the combustion chamber.

It is also known for the high pressure pump to be constituted by a variable-flow pump controlled by an electronic regulator module for the engine, thereby making it easier to adapt the delivered flow rate to the requirements of the engine.

In either case, a hydraulic actuator for actuating a variable-geometry component of the engine is controlled by a servo-valve having a high pressure admission inlet connected to the outlet from the pump and a low pressure exhaust outlet connected to a low pressure fuel feed line upstream from the pump.

When a sudden movement of the variable-geometry component is required, the fuel taken from the high pressure pump outlet leads to a disturbance in the feed to the injectors. This disturbance is made greater when the dynamic range of the metering equipment or of the assembly constituted by the variable flow rate pump and the electronic regulator module is small. This disturbance needs to be kept as small as possible since otherwise it can lead to engine malfunctions under certain flying conditions, such as pumping and engine flame-out.

OBJECT AND SUMMARY OF THE INVENTION

An object of the invention is to propose a fuel feed circuit for an aircraft engine that makes it possible, in very simple manner, to prevent a sudden movement of a variable-geometry component giving rise to a significant disturbance in the flow rate of the fuel delivered to the injectors.

This object is achieved by a fuel feed circuit for an aircraft engine, the circuit comprising a pump delivering fuel under high pressure to a pump outlet, a pipe for feeding fuel to combustion chamber injectors and connected to the pump outlet, and at least one servo-valve for controlling a hydraulic actuator of a variable-geometry component of the engine, wherein a head loss element is interposed between the pump outlet and the injector feed pipe, and the servo-valve has a high pressure admission inlet connected to the outlet from the pump upstream from the head loss element and a low pressure exhaust outlet connected to the injector feed pipe downstream from the head loss element.

Thus, the flow rate taken from the outlet of the high pressure pump, upstream from the head loss element for the purpose of driving the movement of a hydraulic actuator is substantially compensated by the flow rate reinjected downstream from the head loss element.

The head loss element may be a mechanism enabling head loss to be regulated.

The head loss constitutes the pressure difference used for driving an actuator. It is necessary to find a compromise between this head loss, which should preferably as small as possible, and the geometry of the actuator. For a given force to be produced, the greater the head loss the smaller it is possible for the actuator to be. A head loss value lying for example in the range 10 bars to 40 bars enables most requirements to be satisfied, but under certain circumstances, the head loss could be selected to lie outside this range.

BRIEF DESCRIPTION OF THE DRAWING

The invention can be better understood on reading the following description with reference to the accompanying drawing, in which.

DETAILED DESCRIPTION

An embodiment of a fuel feed circuit in accordance with the invention is described below in the context of an application to a gas turbine engine for an airplane. Nevertheless, the field of application of the invention extends to gas turbine engines for other aircraft, in particular helicopters, and to aeroengines other than gas turbines.

Figure 1:
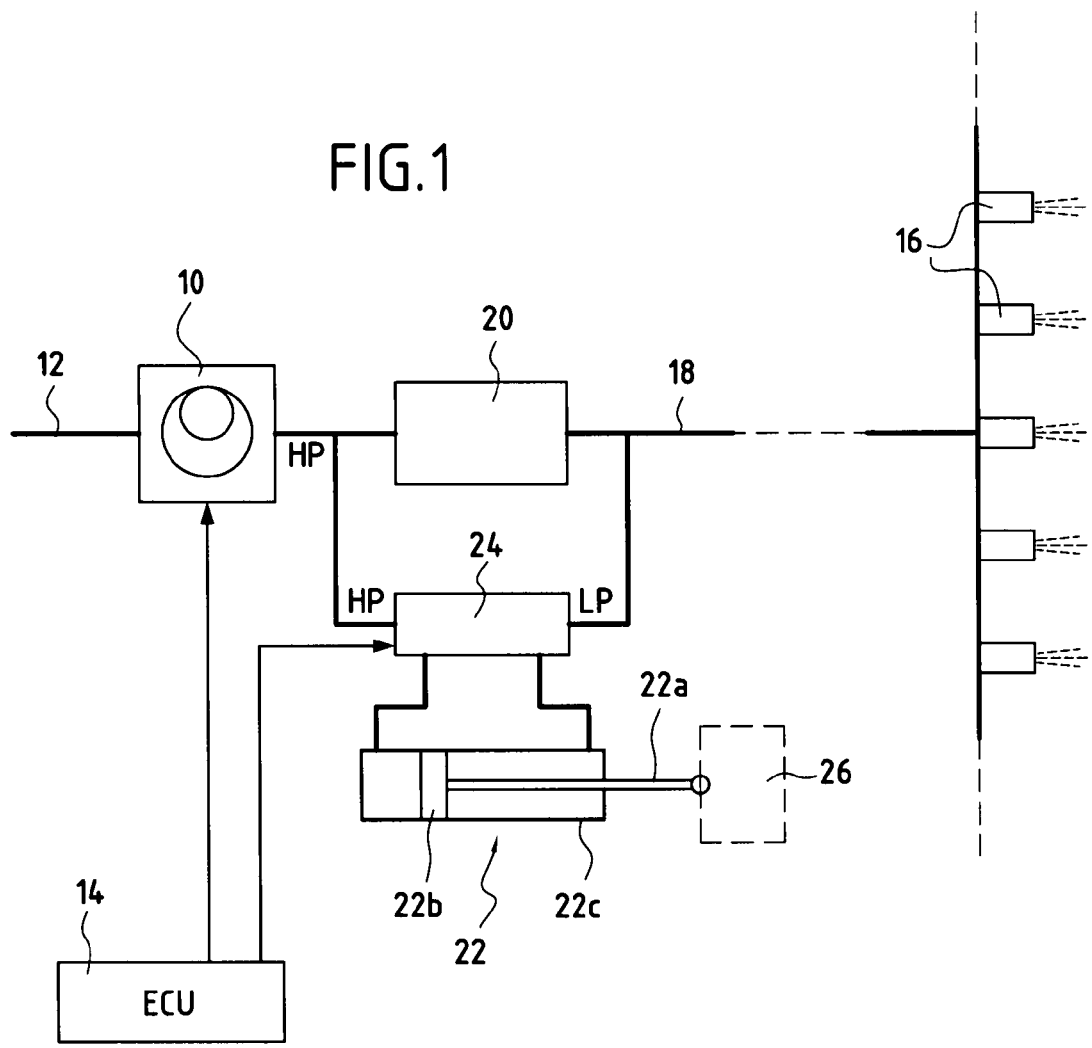
FIG. 1 is a highly diagrammatic view of an embodiment of a fuel feed circuit in accordance with the invention.

In FIG. 1, reference 10 designates a variable-flow high pressure pump having its inlet connected to a low pressure fuel feed line 12, e.g. a line connected to an outlet from a low pressure pump (not shown). The flow rate of the pump 10 is controlled by an electronic module 14 for regulating the engine and known as an electronic control unit (ECU). This is done in a manner that is itself well known for the purpose of adapting the flow rate to the requirements of the engine.

Fuel injectors 16 of a combustion chamber of the engine are fed by a feed pipe 18. The high pressure (HP) outlet from the pump 10 is connected to the pipe 18 via a head loss element 20.

One or each of a plurality of hydraulic actuators 22 (only one shown in the figure) is controlled by a respective electro-hydraulic servo-valve 24 for moving a respective variable-geometry component of the engine. The actuator 22 is shown in the form of a cylinder having a piston rod 22a that is mechanically connected to the variable-geometry component that is to be controlled (represented by box 26). The variable-geometry component may be for example be a ring for controlling the pitch angle of variable stator vanes (VSVs), i.e. vanes in the flow-straightening stages of the compressor of the gas turbine engine, or a variable bleed valve (VBV) of the compressor, or a transient bleed valve (TBV) of the compressor, or a valve for adjusting the flow rate of air for a system for controlling clearance at the tips of the rotor blades, either in a low pressure turbine active clearance control (LTACC) system or in a high pressure turbine active clearance control (HPTACC) system.

The servo-valve 24 has a high pressure (HP) admission orifice or inlet connected to the outlet from the pump 10, upstream from the head loss unit 20, a low pressure (LP) exhaust orifice or outlet connected to the pipe 18 downstream from the head loss element 20, and utilization orifices connected to the chambers of the cylinder 22c of the actuator 22 on either side of the piston 22b.

When it is necessary to move a variable-geometry component, the servo-valve 24 is controlled by the electronic regulation module 14 so as to put one of the chambers of the
} cylinder 22 into communication with the HP admission inlet and the other chamber of the cylinder 22 into communication with the LP exhaust outlet. The flow from the chamber that increases in volume is taken upstream from the head loss unit 20, while the flow from the chamber that decreases in volume is reinjected downstream from the head loss element. The difference between the flow that is taken off and the flow that is reinjected is very small, due essentially to variation in the volume of the piston rod 22a within the actuator cylinder 22c. Thus, a sudden takeoff from the outlet of the high pressure pump for the purpose of moving a variable-geometry component does not lead to any significant disturbance to the flow rate in the pipe 18 feeding the injectors.

This result is obtained in a manner that is particularly simple by means of the presence of the head loss element 20. An increase in the outlet pressure from the pump 10 is nevertheless required in order to accommodate the head loss that is imposed by the element 20. This does not raise any technological difficulty since the high pressure pump commonly used in fuel feed circuits for aircraft engines can easily deliver extra pressure of the order of one to a few tens of bars. It should be observed that a relatively small amount of head loss can be used insofar as the diameter of the piston 22b is sufficient to drive the variable-geometry component by the pressure difference that corresponds to the head loss. In most cases, head loss lying in the range 10 bars to 40 bars should satisfy requirements.

Various embodiments of the head loss elements 20 could be selected.

Thus, the head loss element 20 may merely be in the form of a diaphragm.

Nevertheless, it is advantageous to make use of a mechanism that enables the head loss to be regulated to a given value, thus enabling a substantially constant pressure difference to be maintained between the admission and exhaust orifices of the servo-valve. This makes it easier to determine the mechanical dimensions of the assembly comprising the servo-valve and the actuator, and also makes it easier to develop the local control loop.

Figure 2:
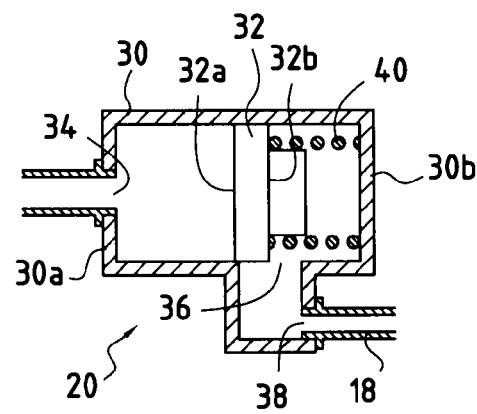
FIG. 2 is a diagrammatic section view of an embodiment of a head loss regulator valve forming part of the FIG. 1 circuit.

FIG. 2 shows in simplified manner a valve that performs the function of regulating head loss to a value that is substantially constant.

The valve 20 comprises a cylinder 30 having a piston 32 mounted therein. At one end, the cylinder presents a high pressure (HP) inlet opening 34 connected to the outlet from the pump 10. The piston 32 is axially movable in the cylinder 30 with the position of the piston determining the flow section through a slot 36 formed in the side wall of the cylinder 30 and connected to the pipe 18 via a low pressure (LP) outlet 38. The piston 32 has a front face 32a facing the end wall 30a of the cylinder in which the HP inlet opening 34 is formed, and a rear face 32b against which a spring 40 exerts a resilient return force, the spring being disposed between the piston 32 and the end wall 30b of the cylinder opposite from the wall 30a.

When the pressure difference between the HP inlet 34 and the LP outlet 38 increases, the piston 32 moves against the force of the return spring 40, thereby increasing the flow section through the slot 38 and reducing the head loss.

Conversely, when the pressure difference between the HP inlet 34 and the LP outlet 38 decreases, the piston 32 is pushed back by the spring 40, thereby reducing the flow section through the slot 36 and increasing the head loss.

The value of the head loss is determined by the rating of the spring 40.

Although the description above relates to a fuel feed circuit that uses a variable flow rate high pressure pump, the invention is equally applicable to circuits using a high pressure pump of some other type, in particular a fixed cylinder capacity pump that is not under the control of the ECU such as a volumetric gear pump driven by an AGB. Metering equipment is then inserted in the fuel feed pipe, downstream from the connection to the exhaust outlet from the servo-valve.

What is claimed is:

1. A fuel circuit for an aircraft engine, the circuit comprising:
   a pump delivering fuel under high pressure to a pump outlet; a head loss element having an inlet connected to the pump outlet, for receiving fuel at said high pressure and an outlet delivering fuel at a pressure lower than said high pressure to an injectors feed pipe;
   a servo-valve having a first high pressure inlet connected to the outlet upstream from the head loss element and a second low pressure outlet connected to the injectors feed pipe downstream from the head loss element; and
   a hydraulic actuator of a variable-geometry component of the engine connected to utilization orifices of the servo-valve, the servo-valve being controlled by an electronic regulator module of the engine when displacement of the variable-geometry component is desired to feed high pressure fuel taken from the pump outlet to a first chamber of the hydraulic actuator and receiving from a second chamber of the hydraulic actuator low pressure fuel which is fed to the injectors feed pipe.

2. A circuit according to claim 1, wherein the head loss element is a mechanism enabling head loss to be regulated.

3. A circuit according to claim 1, wherein the head loss element comprises a diaphragm.

4. A circuit according to claim 1, wherein the head loss element is dimensioned to generate a head loss lying in the range 10 bars to 40 bars.

5. An aircraft engine including a fuel feed circuit according to claim 1.

6. A circuit according to claim 2, wherein the head loss element includes a cylinder having a piston mounted therein, the inlet connected to the pump outlet for receiving fuel at said pressure is provided at a first end wall of the cylinder, and the outlet delivering fuel at the lower pressure is connected to a slot disposed in a side wall of the cylinder.

7. A circuit according to claim 6, wherein the piston includes a front face which faces the first end wall and a rear face which abuts a spring disposed between a second end wall of the cylinder and the piston.

8. A circuit according to claim 7, wherein axial movement of the piston within the cylinder is based on a pressure difference between the inlet and the outlet of the head loss element.

* * * * *